United States Patent Office 3,579,324
Patented May 18, 1971

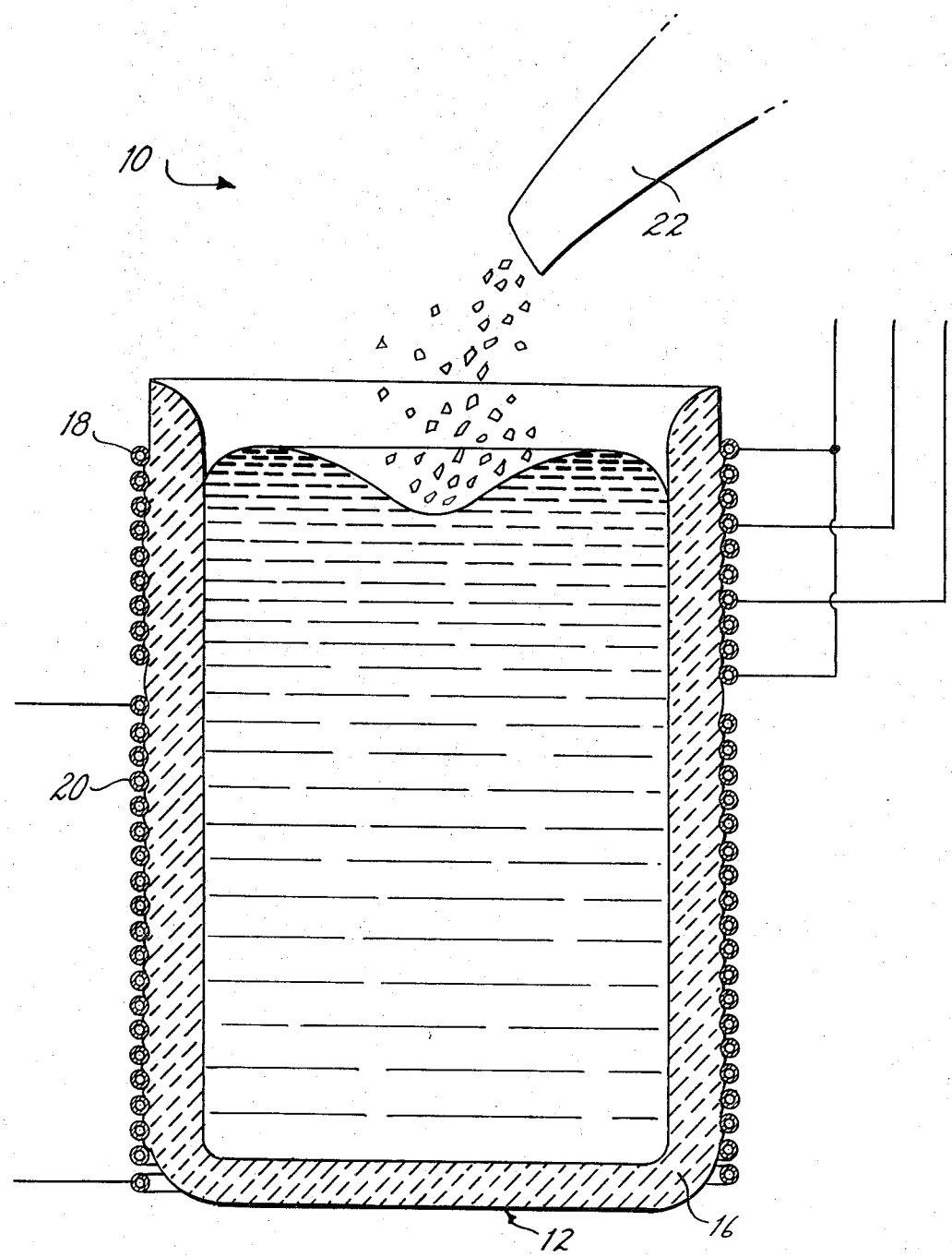

3,579,324
METHOD FOR INDUCTION MELTING OF FINE PARTICLES
Theodore R. Kennedy, Willingboro, and Henry M. Rowan, Moorestown, N.J., assignors to Inductotherm Corporation, Rancocas, N.J.
Filed Nov. 18, 1968, Ser. No. 776,450
Int. Cl. C22d 7/00; H05b 5/08
U.S. Cl. 75—10                                   1 Claim

ABSTRACT OF THE DISCLOSURE

The ability of a coreless induction furnace to melt fine particles is enhanced by providing a lower single phase coil which supplies melting currents and an upper polyphase coil which stirs the molten metal so as to lift the outer rim of molten metal adjacent the surface.

---

This invention relates to induction apparatus and method for melting fine particles. More particularly, this invention relates to an improved coreless induction furnace and method for melting fine metallic particles such as chips, turnings, or the like without clogging the top of the furnace or sintering the fine particles.

The compressive forces generated in a magnetic induction furnace are such that the molten metal is constantly stirred when the furnace windings are energized. The stirring effect in coreless induction furnaces is one of its great advantages since it tends to distribute both the metal and the heat uniformly throughout the interior of the crucible. This same advantage has been the precise reason why the coreless induction furnace is considered the best means for melting fine particles such as metal chips, turnings and the like. The stirring forces created in a coreless furnace rapidly absorb and distribute them throughout the melt. Another advantage of the coreless induction furnace is the melting of fine particles in the absence of an oxidizing agent such as would be created by a gaseous flame or the like.

Evaluation of a single phase coreless induction furnace for melting fine particles has resulted in a finding that at least a portion of the fine particles are not rapidly absorbed into the melt. Indeed, some of the particles are never absorbed. Analysis shows that the cause of this partial failure of the coreless induction furnace to absorb all of the fine particles is the convex meniscus created by the magnetic forces when a single phase coil is positioned adjacent the top surface of the melt. The convex shape of the melt surface causes a large portion of the fine particles to be thrown or slide off toward the sides of the crucible. This action is compounded by the effect of the magnetic forces at the surface of the melt which also tend to drive the particles toward the side of the crucible. A certain amount of the particles which are driven to the sides of the crucible are sintered or otherwise affected just enough to prevent them from being absorbed into the molten metal. After a number of heats have been completed, the area of the furnace adjacent its top may be clogged with partly sintered fine particles that the furnace can no longer be operated until they are removed at large cost in labor.

Past attempts in solving the problem have been only moderately successful in reducing the accumulation of partly sintered material while still maintaining the ability to efficiently melt fine particles in economically large quantities. One such approach has been the use of a funnel or chute positioned to direct a continuous stream of fine particles onto the topmost portion of the meniscus while at the same time using a relatively low frequency so as to increase the turbulence for faster absorption of the lighter particles into the melt.

The present invention seeks to overcome the foregoing difficulties and to improve the ability of coreless induction furnaces to melt fine metal particles. In accordance with the present invention, the primary cause of the problem, namely the convex meniscus, is removed and a concave surface shape substituted in its place. The obvious advantage of an inverted, cone shaped surface is elimination of the tendency of the meniscus to throw the fine particles toward the side walls of the crucible. Moreover, this cone shape tends to draw the fine particles into the center of the melt where they may be readily absorbed. In accordance with the present invention the inverted, cone shaped meniscus created by stirring the upper portion of the melt in a manner that lifts the outer rim of metal axially in the crucible and hence, create an inverted cone in the surface of the melt. The advantage of using a cone shape is that it draws the particles down into the center of the melt.

The aforesaid cone is created by positioning multiphase coils adjacent the upper portion of the crucible walls so that an upward stirring force is applied to an annular circumferential portion of the metal adjacent its surface. This axial force on the outer rim of metal physically lifts the outer perimeter of the metal higher than the inner portion. The overall effect on the molten metal bath is to cause the metal near the surface to rise at the sides of the crucible and flow toward the middle so that chips or fine particles come in contact with the metal surface are directed inwardly and downwardly. It is somewhat like a vortex without the whirling action.

It is well known that multi-phase coils make rather inefficient heating and melting coils primarily due to the mutual inductance between the closely spaced phase coils. Techniques are known for increasing the efficiency of multi phase coils but none raises them to the level of a single phase coil. The purpose of multi phase coils used in the present invention is to create the aforesaid vortex. The natural stirring which takes place in using a single phase induction furnace is more than sufficient to adequately mix the molten metal with the incoming solid, fine particles, provided some means is used to draw them into the molten metal. Accordingly, the present invention uses a single phase coil positioned below the multi phase stirring coil and surrounding a major portion of the crucible. The second, single phase coil is designed solely to provide heat energy to melt the particles drawn in through the top surface by the stirring coils. This means that the power level, frequency and other factors for the single phase heating coil can be selected so as to be appropriate to that coils particular function while the power level, frequency and the like for the multi phase coil can be selected so as to best serve its function.

For the purpose of illustrating the invention, there is shown in the drawing a form which is presently preferred; it being understood, however, that this invention is not limited to the precise arrangements and instrumentalities shown.

The drawing shows the longitudinal sectional view of furnace constructed in accordance with the present invention.

Referring now to the drawing in detail, wherein like numerals indicate like elements, there is shown in FIG. 1 a coreless induction furnace 10 for melting fine particles in accordance with the process of the present invention.

The furnace 10 includes a crucible 12 having a refractory lining 16 which is conventional for this type of furnace and may comprise, for example, a rammed refractory.

In the embodiment shown, there are two coils of conductors wound about the side walls of the furnace. The first coil 18 is wound about the upper portion of the furnace and may be referred to as the stirring coil. The second coil 20 is wound about the lower portion of the furnace and may be referred to as the heating or melting coil. The stirring coil 18 takes up approximately ⅓ of the total axial length of both coils and the melting coil 20 takes up the remainder in the preferred embodiment. However, those skilled in the art will recognize that the axial length of the stirring coil may be adjusted and positioned in accordance with the requirements of the furnace. The major requirement is that it be positioned at a point where the magnetic forces generated by the current passing through the stirring coil 18 will be applied to the molten metal at a point near its surface so as to obtain the desired stirring effect. The melting coil 20 is a conventional single phase helical coil whose primary function is to induce melting current within the molten metal contained within the crucible 12. Coils 18 and 20 are preferably made of hollow copper tubing through which a coolant, such as water, may be passed when they are energized.

In the embodiment shown, the stirring coil 18 is in reality three distinct helical coils adapted to be connected to a polyphase system. In the preferred embodiment, the polyphase system is a conventional three phase system, but those skilled in the art will readily recognize that the stirring coil 18 can be modified for connection to other polyphase systems such as a two phase or six phase system. The particular design of the coils and the method of connecting them in proper phase progression to the polyphase source is fully explained in Kennedy U.S. Pat. No. 3,314,670 issued Apr. 18, 1967. Accordingly, there is no need in the present application to set forth in extensive detail the particular dimensions and arrangements of the stirring coil 18. It is sufficient to state that the stirring coil 18 is connected to a multi-phase source in appropriate phase progression so that the stirring forces create an axial flow of molten metal along the walls of the crucible from the lowermost portion of the coil 18 toward the surface of the molten metal. The net result of this stirring action is to lift the outer periphery of the molten metal above the inner part of the surface and hence create a surface shape which has the form of an inverted cone. The stirring forces created by the coil 18 cause the molten metal to flow not only upwardly but also inwardly and hence the surface takes the form of an inverted cone such as is illustrated in the drawing. It should be understood that although the cone is shown in the center of the melt, it does tend to move about the surface while the furnace is in operation.

By changing the phase progression of coil 18, the melt surface could merely be violently agitated without forming the cone.

Fine particles of material which may be in the form of turnings, chips, light scrap, or even powder are fed into the crucible by any conventional means such as the chute 22. In accordance with the present invention the chute 22 directs the fine particles into the cone created by the stirring coil 18. The inward and downward flow of the molten metal carries the metal particles directly into the center of the melt before they can float or otherwise be forced toward the crucible wall and there become sintered.

The multiphase coil 18 can be operated at lower levels of power and different frequencies than the single phase coil 20. The operational power levels and frequencies are preferably chosen so as to obtain the requisite type of stirring. In other words, the frequency and power level applied to the coil 18 are chosen so as to be adequate to generate magnetic forces of sufficient strength to raise an annular portion of the molten metal to a level above the remaining area at the top of the melt. The particular choice of frequency for the multiphase coil 18 depends in part on the capacity of the furnace, the resistivity of the metal being melted and stirred, and a consideration on whether the coil 18 is to be designed solely to stir or is to have both a heating and stirring function. A general relationship between stirring motion and heating can be stated as follows: For a fixed, predetermined amount of heating, the magnetic forces generated are a function of the inverse of the square root of the frequency; that is, the magnetic forces are a function of $\sqrt{1/f}$. It therefore is an advantage to use a lower frequency for stirring than for heating. However, the particular frequency desired can be adjusted if both heating and stirring are required. Moreover, it may be desirable to maintain the stirring forces only in a small annular region adjacent the crucible walls. It therefore may be necessary to use a higher frequency which inherently reduces the depth of penetration of the magnetic flux.

The overall dimensions of the stirring coil may vary widely depending upon the size and density of particles to be melted. In the embodiment shown the stirring section is approximately ⅓ of the overall axial length of both coils. However, variations from ⅓ to ¾ of the overall length would not be unusual.

The stirring coil shown in the embodiment consists of a three phase coil but other phase numbers for the multi-phase coil can be used. The three phase coil is shown since that is generally the most common available source. However, where other multi-phase sources are available or space requirements demand, then higher or lower phase numbers may be used. Regardless of which phase number is selected, the major consideration is that there be a unidirectional, axial phase displacement from coil to coil as the multi-phase source proceeds through each electrical cycle. The appropriate phase progression in the embodiment shown is accomplished merely by inverting one of the phases as shown.

In the embodiment shown, the single phase coil 20 is connected to a separate source. However, it is entirely within the realm of this invention to connect the coil 20 to one of the phases of the multi-phase source so that both the stirring coil 18 and the heating coil 20 are connected to the same source. This is an advantage where the rate at which cold particles being supplied to the furnace is such that the volume added may exceed the capacity of the lower section to melt the added particles. By connecting the stirring coil to the same source as the heating coil, additional heat may be supplied for melting the particles.

A furnace constructed in accordance with the foregoing principles has several advantages. The ability to generate magnetic forces that violently agitate the molten metal at and near the surface while maintaining relatively higher power levels with less agitation in the lower portion of the melt is excellent for the melting of alloys and light particles which must be quickly assimilated into the molten metal. Another advantage of this furnace is the increase in refractory life because there is less refractory erosion in the lower parts of the crucible. The absence of refractory erosion is particularly important in vacuum degassing apparatus where an excess of agitation can result in refractory inclusions which reduce the quality of the metal.

Another area where the foregoing described furnace may be used to advantage is in the manufacture of steel or other metals where the slag floating on its surface chemically reacts with the refractory lining of the crucible. This chemical attack occurs at the slag line where heavy cutting into the crucible wall due to chemical combinations and mechanical erosion may be observed. The use of multi-phase coils in the area of the slag line causes the slag to be held away from the side walls therefore minimizing the problem.

The present invention may be embodied in other specific forms without departing from the spirit or essential attributes thereof and, accordingly, reference should be made to the appended claim, rather than to the foregoing specification as indicating the scope of the invention.

It is claimed:
1. A method or melting fine particles in a coreless induction furnace for more efficiently absorbing them into the melt comprising the steps of using a crucible for containing molten metal, a first induction winding surrounding a lower portion of said crucible and a second, multiphase induction winding surrounding an upper portion of the crucible above said first induction winding, energizing said first induction winding so as to induce melting currents in a lower portion of the molten metal contained within said crucible, and energizing said multiphase winding at a frequency and phase sequence such that the stirring action induced in the molten metal forms a non-rotating inverted cone in the surface of the molten metal by lifting the molten metal adjacent the crucible wall, whereby fine particles added to the melt are drawn away from the crucible walls into the center of the melt and absorbed thereat.

References Cited

UNITED STATES PATENTS

| 1,822,539 | 9/1931 | Northrup | 13—26 |
| 1,904,664 | 4/1933 | Neuhauss | 75—10 |
| 1,939,623 | 12/1933 | Clamer | 75—12 |
| 1,940,622 | 12/1933 | Clamer | 75—10 |
| 1,946,873 | 2/1934 | Neuhauss | 75—12 |

FOREIGN PATENTS

| 423,326 | 1/1935 | United Kingdom | 13—26 |

WINSTON A. DOUGLAS, Primary Examiner

P. D. ROSENBERG, Assistant Examiner

U.S. Cl. X.R.

13—26